United States Patent [19]

Masutomi et al.

[11] 4,322,386
[45] Mar. 30, 1982

[54] CATALYTIC APPARATUS

[75] Inventors: Hiroshi Masutomi; Minoru Izutsu, both of Hiroshima, Japan

[73] Assignee: Babcock-Hitachi Kabushiki Kaisha, Tokyo, Japan

[21] Appl. No.: 76,784

[22] Filed: Sep. 18, 1979

[30] Foreign Application Priority Data

Sep. 19, 1978 [JP] Japan .................................. 53-114116
Sep. 19, 1978 [JP] Japan .................................. 53-114117
Sep. 19, 1978 [JP] Japan .................................. 53-114118
Apr. 17, 1979 [JP] Japan .................................. 54-46050

[51] Int. Cl.³ ........................ B01D 57/02; B01J 15/00; B60P 1/52; B60P 9/00
[52] U.S. Cl. .................................... 422/171; 414/180; 422/176; 422/180; 422/187
[58] Field of Search ........ 422/171, 177, 180, 211–213, 422/219, 311, 222, 191, 176, 187; 414/180, 495

[56] References Cited

U.S. PATENT DOCUMENTS

| 676,025 | 6/1901 | Bronder | 414/180 |
| 1,867,325 | 7/1932 | Neville | 422/177 |
| 2,310,907 | 2/1943 | McMillan | 422/219 X |
| 2,718,460 | 9/1955 | Bowen | 422/191 |
| 2,905,523 | 9/1959 | Houdry et al. | 422/190 X |
| 3,412,878 | 11/1968 | Todd | 414/180 X |
| 4,160,009 | 7/1979 | Hamabe | 422/177 X |

Primary Examiner—Bradley Garris
Attorney, Agent, or Firm—Koda and Androlia

[57] ABSTRACT

A catalytic apparatus characterized in that a plurality of catalyst elements are arranged to form a catalyst block and thus formed catalyst blocks are placed in the passage of exhaust gas. This apparatus permits to form a catalyst bed easily in the exhaust gas duct and ensures a good quality of the formed catalyst bed.

6 Claims, 17 Drawing Figures

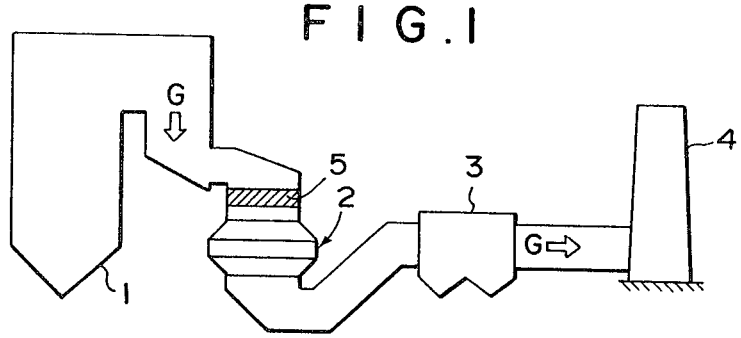
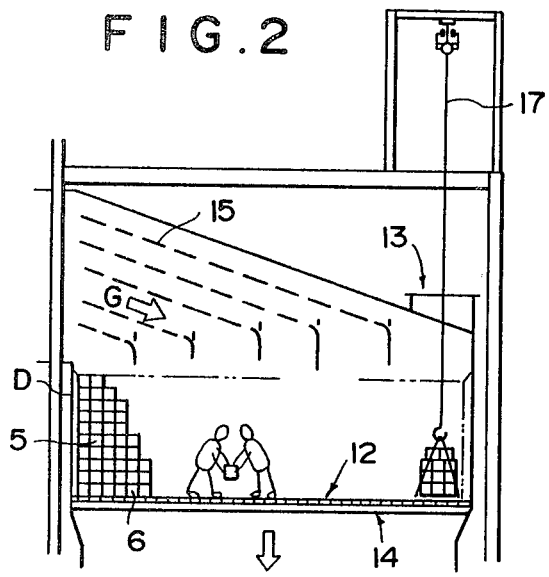
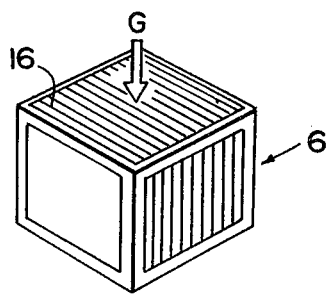
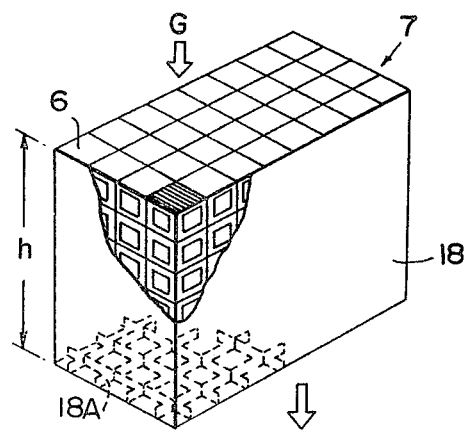
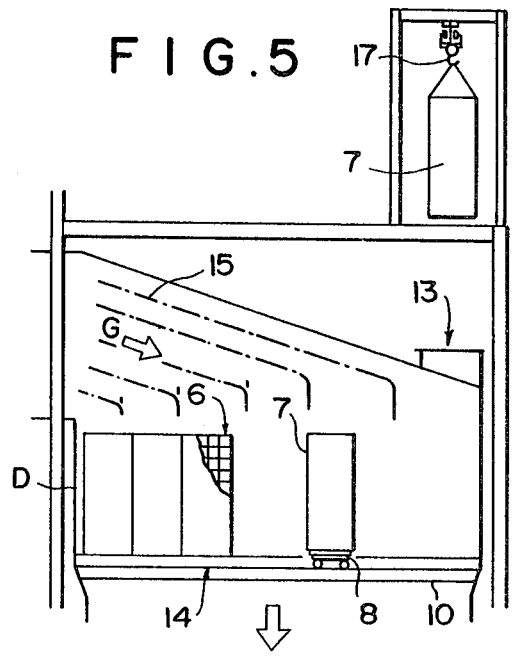

4,322,386

CATALYTIC APPARATUS

BACKGROUND OF THE INVENTION

1. Field of the Invention

This invention relates to a catalytic apparatus. More particularly, the invention relates to the construction of the catalyst bed filling portion of a parallel flow type denitration apparatus.

2. Description of the Prior Art

In a dry type exhaust gas denitration apparatus, a catalyst bed is formed in the passage of high temperature boiler exhaust gas and ammonia gas is injected upstream of the gas passage to remove nitrogen oxides from the exhaust gas passing through the catalyst bed by decomposing them into water and nitrogen. Out of such apparatuses, there is a parallel flow type denitration apparatus in which a catalyst bed of plate type of honey-comb type catalyst is formed and which is featured in that the pressure loss in the course of the gas passing through the catalyst bed is such that it can be covered with the surplus in fan capacity provided in the boiler design stage. Referring to FIG. 1, the exhaust gas G produced in boiler 1 is denitrated in the catalyst bed 5 formed between economizer exit and air heater 2 and is then released to the open air from stack 4 through air heater 2 and dust collector 3. The catalyst bed 5 is formed by piling up in duct D, as shown in FIG. 2, a number of catalyst elements 6 each consisting of a plurality of catalyst plates 16 spaced as shown in FIG. 3. That is, in duct D there is provided a catalyst supporting beam 14 on which grating 12 or the like is placed. Catalyst elements 6 are carried in duct D through hatch 13 using a transporting means 17 such as chain block or the like and are then piled up by the human power of 35 workers to form catalyst bed 5. Therefore, much labor and time are required for carrying in and out of and refilling with catalyst. Further, individual catalyst elements 6 have to be placed one by one and, hence, there is the possibility of their being located out of position, in which case smooth passing of exhaust gas G is disturbed. Therefore, constant control is necessary for the catalyst bed.

It is an object of this invention to provide a catalytic apparatus which facilitates carrying in and out of and refilling with catalyst.

It is another object of the invention to provide a catalytic apparatus which allows the exhaust gas to pass easily and can keep the quality of catalyst bed excellent at all times.

SUMMARY OF THE INVENTION

The foregoing objects have been accomplished by this invention. That is, a plurality of catalyst elements are arranged to form a catalyst block, and thus formed catalyst blocks are placed in the passage of exhaust gas. To facilitate the transportation and placing of catalyst blocks in the passage of exhaust gas, there can be provided in the passage of exhaust gas a car for transporting catalyst blocks which has a vertically moving table, a car guide, such as rail, which serves to guide the car, and a beam on which catalyst blocks are to be placed. Further, the gap between adjoining catalyst blocks, the gap between the reactor wall and the side of catalyst block and the space formed between the reactor wall and the member provided at the side of catalyst block adjacent thereto are sealed respectively by a seal plate provided at one side of the bottom of catalyst block, a wall seal plate extending from the reactor wall and a bridge seal plate so that short-circuiting of the gas being treated is prevented and dust accumulation is also prevented, thereby the reaction efficiency of catalyst can be raised.

BRIEF DESCRIPTION OF THE DRAWINGS

FIG. 1 is a schematic view showing the passage of boiler exhaust gas in which a parallel flow type denitration apparatus is provided.

FIG. 2 is a sectional view of a duct, showing the conventional method of forming catalyst bed by use of catalyst elements.

FIG. 3 is a perspective view of a catalyst element.

FIG. 4 is a perspective view of a catalyst block.

FIG. 5 is a sectional view of a duct, showing the method of forming catalyst bed by use of catalyst blocks.

DETAILED DESCRIPTION OF THE PREFERRED EMBODIMENTS

Figure 6:
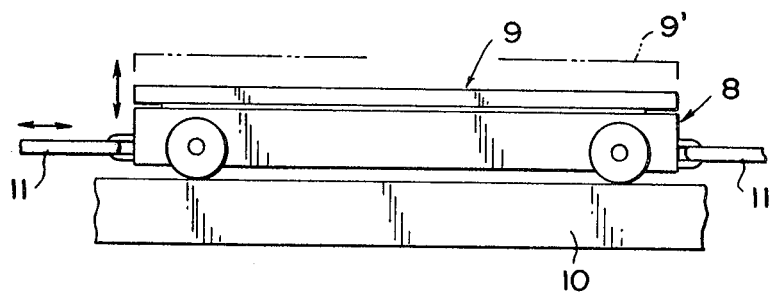
FIG. 6 is a side view of a car for transporting catalyst blocks.

FIG. 4 shows a catalyst block 7 formed by assembling a plurality of catalyst elements 6 shown in FIG. 3. The catalyst block 7 is enclosed with plate 18 made of a metal or any other material having a similar effect so as to strengthen the block formation. In the catalyst block 7, catalyst elements 6 are arranged so that catalyst plates 16 thereof are in parallel with the gas stream G. Further, at the bottom of catalyst block 7, i.e., on the end face thereof at the discharge side of gas G, there is provided a lattice 18A to reinforce catalyst block 7. Still further, it is preferable to make the height h of catalyst block 7 equal to that of the catalyst bed to be formed in exhaust gas duct D. Thus formed catalyst blocks 7 are carried in duct D through hatch 13 by transporting means 17 as shown in FIG. 5 and are placed one by one in duct D by a car 8 moving on the rail 10 provided on supporting beam 14, so that a catalyst bed is formed. The exhaust gas G entering through flow control baffle 15 is denitrated while passing through catalyst plates 16 in catalyst block 7. It should be noted that the procedure for carrying out of and refilling with catalyst blocks 7 can be effected easily by reversing the above-described procedure for forming catalyst bed. The catalyst employed in the foregoing embodiment is of the plate type, but it may be of the corrugated type, honeycomb type or any other suitable type if it permits to circulate the gas.

Figure 7:
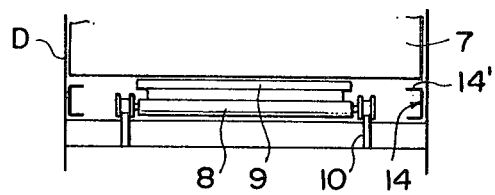
FIG. 7 is a front view of the car with its table in the uppermost position.
Figure 8:
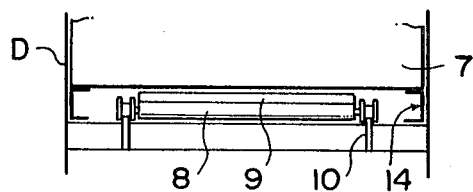
FIG. 8 is a front view of the car with its table in the lowermost position.

Next, in order to facilitate the transportation and placing of catalyst block 7 which is large in volume and weight, the means for transporting catalyst blocks, shown in FIGS. 6-8, can be used. The reference numeral 8 designates a car for transporting catalyst blocks 7. On the top of this car is provided a table 9 for placing catalyst blocks. The table 9 is driven hydraulically or by other means to move up and down. When the table has moved up to the uppermost position 9', the placing plane of table 9 is at a position higher than the top end face 14', shown in FIG. 7, of catalyst supporting beam 14. With the table at the lowermost position, the placing plane is at a position lower than the top end face 14' of supporting beam 14. The reference numeral 11 is a car moving rope provided before and behind car 8 in the moving direction thereof. The method of placing catalyst block 7 will be described hereinbelow. Referring to FIG. 5, catalyst block 7 is first carried in duct D through hatch 13 by block transporting means 17. In this case, just under catalyst block 7 is located car 8 with table 9 at the uppermost position. Next, after catalyst block 7 is placed completely, the operator moves car 8 by pulling in the rope. In this case, the car can be made to move freely because the bottom of catalyst block 7 is higher than the top end face 14' of supporting beam 14 as shown in FIG. 7. When catalyst block 7 reaches a predetermined position, table 9 is lowered slowly. Thus catalyst block 7 is placed on supporting beam 14, and a space is formed between the placing plane of table 9 and the bottom of catalyst block 7 as shown in FIG. 8. Car 8 thus set free is returned by the rope 11, provided on the opposite side to the above-mentioned rope, to the position at which catalyst block is suspended. The reference numeral 10 designates a rail for moving car 8. By repeating the above procedure, a catalyst bed is formed in exhaust gas duct D.

Next, in order to prevent short-circuiting of the reaction gas stream when catalyst blocks are placed in the passage of exhaust gas, the gap between adjoining catalyst blocks, the gap between the side of catalyst block and the wall of reactor, and the space formed between the reactor wall and the member provided at the side of catalyst block are sealed so as to prevent short-circuiting of the reaction gas stream, and further a dust prevention member is provided to prevent dust accumulation in the reactor, thereby the reaction efficiency of catalyst can be maintained constant at all times.

Figure 9:
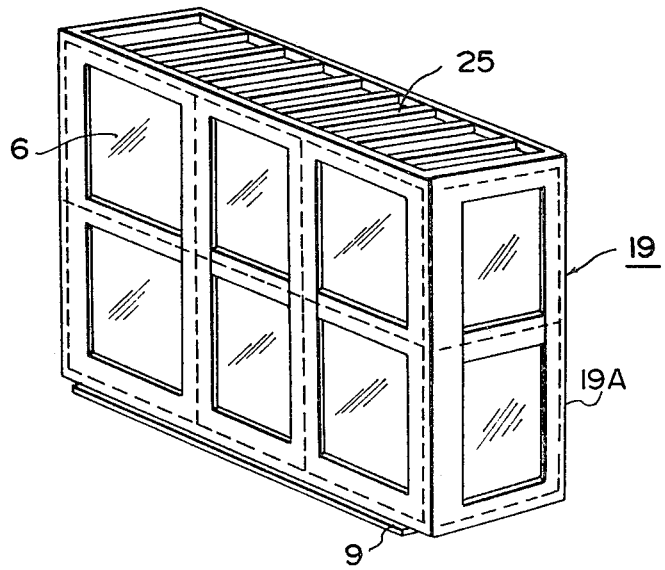
FIG. 9 is a perspective view of an integrated catalyst unit.
Figure 10:
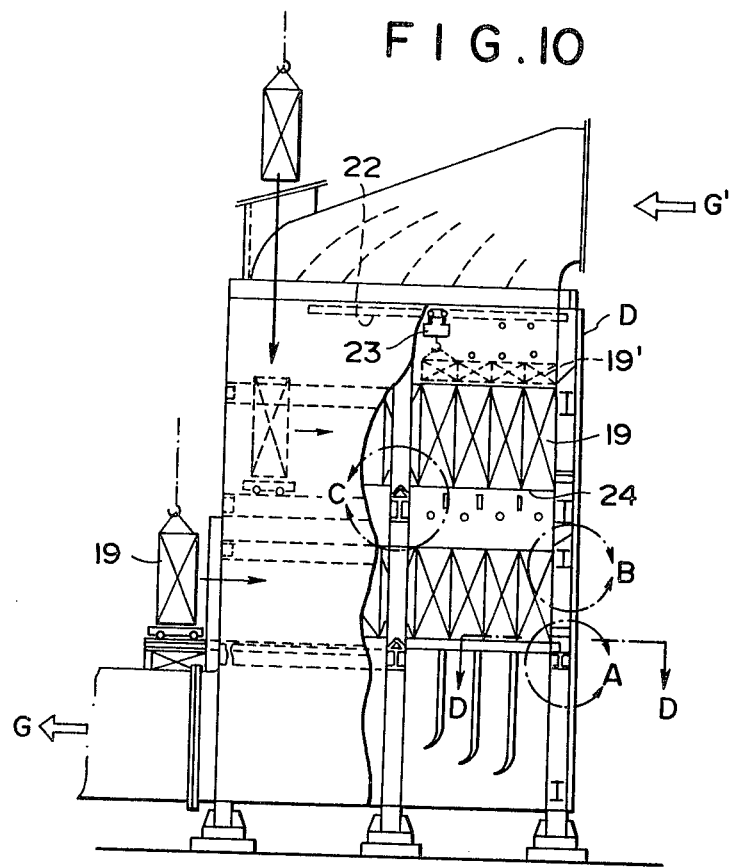
FIG. 10 is a side view, partly in section, of a catalytic apparatus according to the invention.

Employed as the catalyst block is an integrated catalyst unit 19 (FIG. 9) that is formed by housing catalyst elements 6 as shown in FIG. 3 in a box-shaped framework 19A. In FIG. 10, in the catalytic apparatus D, integrated catalyst units 19 are arranged in a plurality of stages, in two stages in the figure. Further, in the uppermost stage thereabove there may be placed an integrated catalyst unit 19 which is smaller in size. Such integrated catalyst units when installed will not leave inutile spaces. However, since a single integrated catalyst unit weighs about 600 kg, special care must be exercised in handling and installing them.

Figure 14:
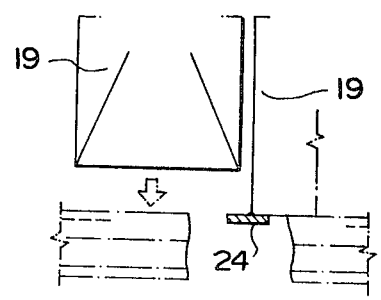
FIG. 14 is a cross-sectional view showing the relation between seal plate 9 and the integrated catalyst unit.
Figure 11:
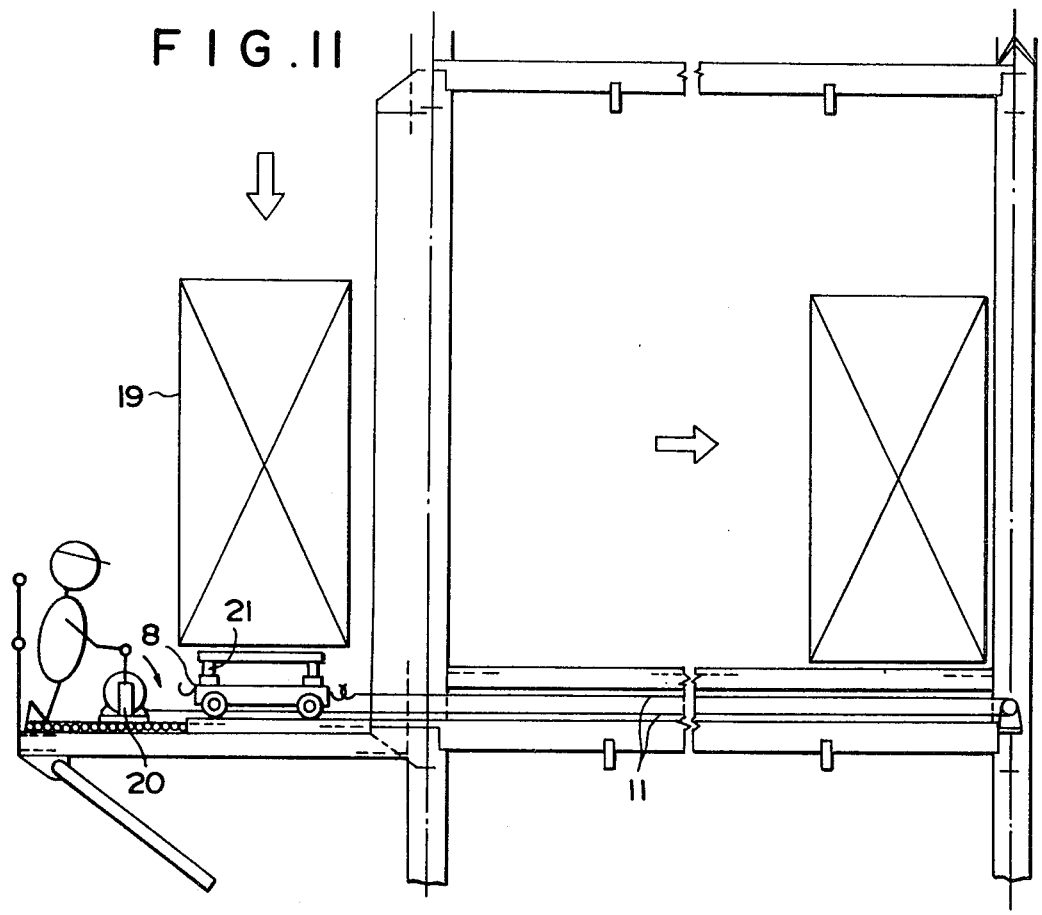
FIG. 11 is a partly side view of the apparatus, illustrating installation of an integrated catalyst unit by use of the car.

FIG. 11 exemplifies the state in which an integrated catalyst unit is installed using an installation car. Integrated catalyst unit 19 is placed on installation car 8 and is carried to the fixed position by the force of a wire 11 connected to winch 20. Unloading at the fixed position may be done either by a hydraulic device 21 or by a hand hoist 23 mounted on ceiling rail 22. In this case, when as described in the above, in order to seal the gap between adjoining integrated catalyst units, seal plate 24 is attached to one side of the bottom of integrated catalyst unit 19 as shown in FIGS. 10 and 14, the above gap can be sealed by merely joining integrated catalyst units, so that short-circuiting of the reaction gas stream is prevented. On the top end face of the framework 19A of integrated catalyst unit 19, there are provided a plurality of flow control bars 25 which also serve to reinforce the framework.

Figure 12:
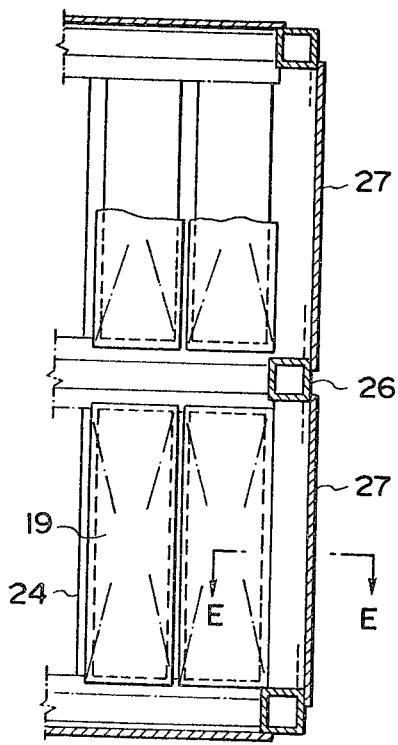
FIG. 12 is a cross-section cut on line D—D of FIG. 10.
Figure 13:
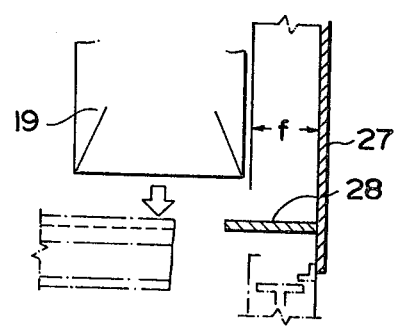
FIG. 13 is a cross-section cut on line E—E of FIG. 12.
Figure 15:
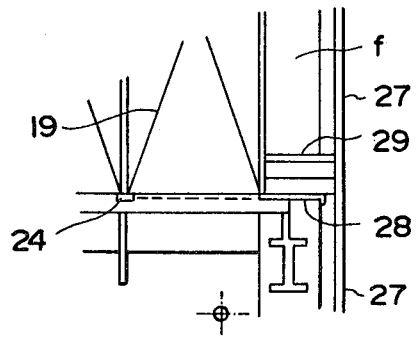
FIG. 15 is a detailed view of part A of FIG. 10.
Figure 16:
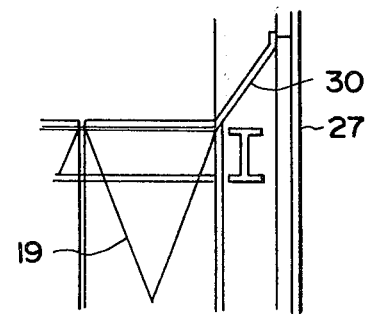
FIG. 16 is a detailed view of part B of FIG. 10.
Figure 17:
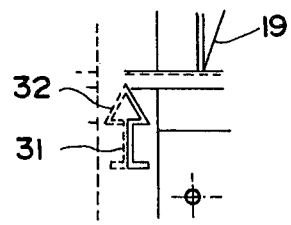
FIG. 17 is a detailed view of part C of FIG. 10.

FIG. 12 is a cross-section cut on line D—D of FIG. 10. It can be seen from this figure that due to the presence of pillar 26 in the catalytic apparatus there is formed a fairly large gap f between wall 27 and integrated catalyst unit 19 when installed. Therefore, when installing integrated catalyst unit 19, it is necessary to attach to wall 27 a wall seal plate 28 which automatically prevents the reaction gas from passing the above gap f. FIG. 15 is a partly sectional view showing the state in which integrated catalyst unit 19 is installed on the wall side. Stopper 29 is attached to wall 27 and serves to fix the stopping position of the car. In this case, to prevent dust accumulation and gas stream in the above-mentioned gap f, there is provided, as shown in FIG. 16, a bridge seal plate 30 which bridges the distance between wall 27 and the top end side of integrated catalyst unit 19. Usually employed as the crossbeam 31 of catalytic apparatus D which is located close to the bottom of integrated catalyst unit 19 is an I-section member whose top is flat. In this case, dust contained in the reaction gas may adhere by bridging to the bottom of integrated catalyst unit and, according to circumstances, accumulate taking root thereat. Therefore, when a bent member forming slopes with a base angle larger than the angle of repose of the dust, i.e., a longitudinal member having a cross-section in the form of angle, is attached to the top of the I-section member as shown in FIG. 17 and is used as dust prevention member 32, it will contribute to continuous operation of the apparatus with no dust accumulation.

According to this embodiment, there are many advantages. For example, there is no leakage of the gas due to its short-circuiting, and the efficiency of removal of deleterious components contained in the gas is raised. Further, the apparatus can operate continuously with no bridging trouble due to dust accumulation. Furthermore, integrated catalyst units can be changed easily.

According to this invention, the catalyst bed can be formed easily, and carrying out of and refilling with catalyst can be done in a short time by a small number of persons.

Further, since catalyst blocks and also catalyst elements can be arranged in good order, the quality of the formed catalyst bed is excellent and denitration can be done effectively.

What is claimed is:

1. A catalytic apparatus placed in a catalytic bed in passage for exhaust gas comprising:
   a plurality of catalyst elements arranged to form a catalyst block, said catalyst block being an integrated catalyst unit comprising a plurality of catalyst elements, each comprising a plurality of parallel, spaced apart catalyst plates arranged in a parallelepiped, housed in a box-shaped framework, a gap between the side of adjoining integrated catalyst units being sealed by a seal plate provided at one side of the bottom of the integrated catalyst unit;
a plate provided on each of four sides of said block for reinforcing said block;
a lattice provided on the discharge side of said block; and
a catalyst block transporting means for transporting said catalyst block into and out of said catalyst bed, said catalyst block transporting means comprising:
a car;
a vertically moving table provided on said car;
a rail extending out of said catalyst bed and for guiding said car; and
a beam provided in said catalyst bed on which a catalyst block is placed.

2. A catalytic apparatus according to claim 1 in which the gap between the side of the integrated catalyst unit and the reactor wall is sealed by a wall seal plate extending from the reactor wall.

3. A catalytic apparatus placed in a catalyst bed in a passage for exhaust gas comprising:
a plurality of catalyst elements arranged to form a catalyst block, said catalyst block being an integrated catalyst unit comprising a plurality of catalyst elements, each comprising a plurality of parallel, spaced apart catalysts plates arranged in a parallelepiped, housed in a box-shaped framework, a space formed between a reactor wall and a pillar member of apparatus provided at a side of the integrated catalyst unit, adjacent thereto is a bridge seal plate that bridges a distance between a top end side of the integrated catalyst unit and the reactor wall;
a plate provided on each of four sides of said block for reinforcing said block;
a lattice provided on the discharge side of said block; and
a catalyst block transporting means for transporting said catalyst block into and out of said catalyst bed, said catalyst block transporting means comprising:
a car;
a vertically moving table provided on said car;
a rail extending out of said catalyst bed and for guiding said car; and
a beam provided in said catalyst bed on which said catalyst block is placed.

4. A catalytic apparatus according to claim 1 in which a dust prevention member is provided on a top of a beam of reactor.

5. A catalytic apparatus according to claim 1 in which a gap between the sides of adjoining integrated catalyst units, a gap between a side of integrated catalyst unit and a reactor wall and a space formed between the reactor wall and a pillar member of the apparatus provided at a side of the integrated catalyst unit adjacent thereto are sealed respectively by a seal plate provided at one side of a bottom of the integrated catalyst unit a wall seal plate extending from the reactor wall and a bridge seal plate that bridges a distance between the top end side of the integrated catalyst unit and the reactor wall, a dust prevention member is provided on a top of the beam of reactor.

6. A catalytic apparatus according to claim 5 in which said dust prevention member is a longitudinal member having a cross-section in the form of angle.

* * * * *